UNITED STATES PATENT OFFICE.

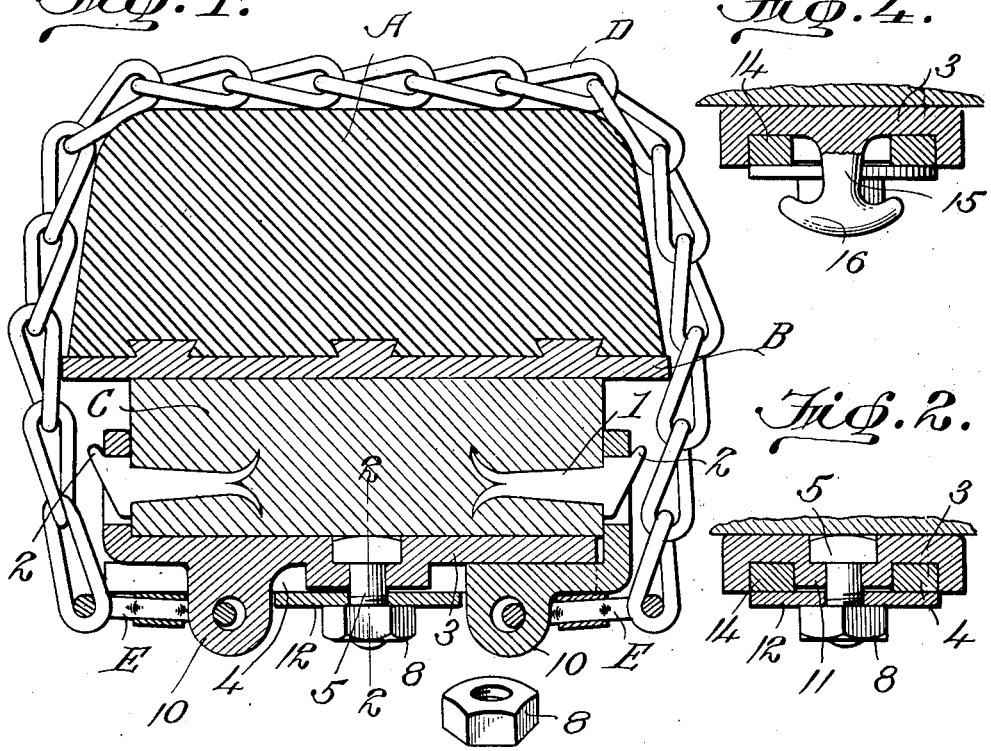
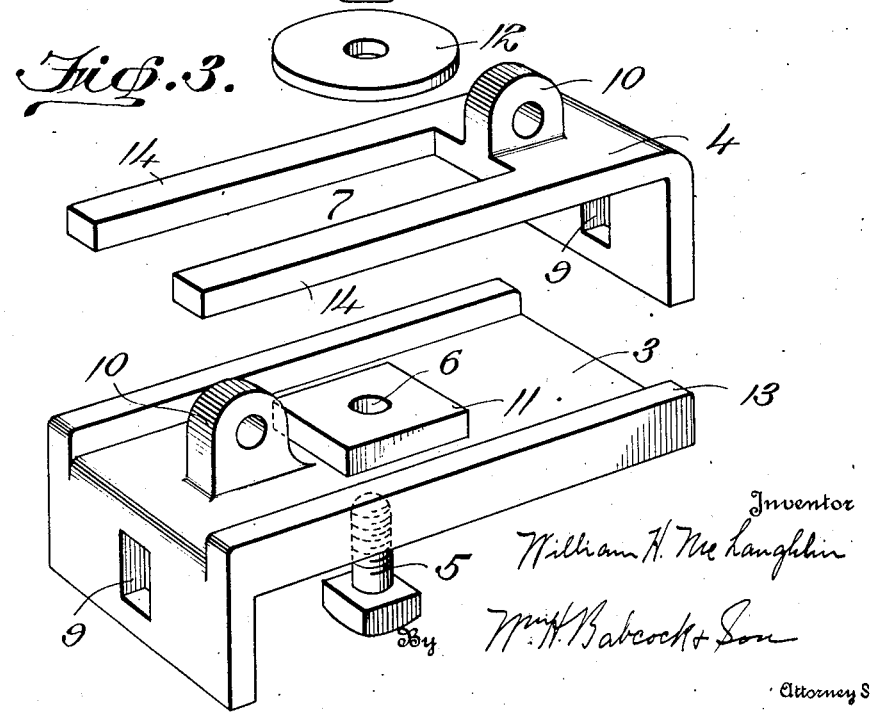

WILLIAM H. McLAUGHLIN, OF HARTFORD, CONNECTICUT, ASSIGNOR TO CASSIUS S. CHASE, OF HARTFORD, CONNECTICUT.

ADJUSTABLE RIGID CLAMP.

1,355,610.  Specification of Letters Patent.  Patented Oct. 12, 1920.

Application filed July 17, 1917. Serial No. 181,037.

*To all whom it may concern:*

Be it known that I, WILLIAM H. McLAUGHLIN, a citizen of the United States, residing at Hartford, in the county of Hartford and State of Connecticut, have invented certain new and useful Improvements in Adjustable Rigid Clamps, of which the following is a specification.

This invention relates to clamps or attaching means preferably formed by molding or drop-forging, and intended especially for use on the wheels of heavy automobile trucks to receive and hold suitable connecting devices connecting the terminal links of anti-skidding chains thereto.

The primary object of this invention is to provide a device of this character which may be readily applied to, and removed from, the felly of a wheel by adjusting a single fastening or binding means with a wrench or other simple tool, which may be adjusted in similar manner to fit a number of fellies of different widths, which will have but few parts, and which will be light but strong and so arranged and braced as to enable it to withstand the heavy strains to be put upon it.

In the accompanying drawings:

Figure 1 represents a cross-sectional view through the tire, rim and felly of a truck wheel and a device embodying my invention applied thereto;

Fig. 2, a sectional view on line 2—2 of Fig. 1;

Fig. 3, a superposed perspective view of the parts of one of the devices separated; and Fig. 4, a detail cross-sectional view of a device showing in elevation a modified form of attaching means, in which the connector used in the preferred form is dispensed with.

Referring now in detail to the drawings, A designates the solid cushion tire of the wheel, B the rim, C the felly, and D the anti-skidding chain provided on each end with a connector E such as shown and described in Patent 1,166,068.

The felly C is provided at intervals with pairs of nails or studs 1 having split points and driven into the felly from its sides, the studs of each pair being driven in from diametrically opposite points of the sides of the felly so that they will have a common central longitudinal line.

The head of each stud 1 has a shoulder lying against the face of the felly and has its outer face inclined inwardly toward the inner periphery of the felly C and is provided with a short lip 2 presented toward the rim B. This is the form shown and is preferred, though not absolutely essential.

Adjustable clamps consisting of two rigid plates 3 and 4 held in adjusted relation to each other by a bolt 5 passing through a hole 6 in plate 3 and a longitudinal slot 7 in plate 4, a washer 12 of sufficient size to span said slot 7 and a nut 8 turned on the end of bolt 5 after washer 12 has been slipped on, are provided with sides preferably integral and at right angles to the remainder of each plate. These sides are provided with slots or cut-out portions 9 to receive the heads of said studs 1 and fit between the lips 2 respectively and the adjacent faces of the felly C.

The face of plate 3 presented toward said felly C is provided with an angular recess surrounding hole 6 and corresponding in size and shape to the angular head of the bolt 5 and has the corresponding portion of its other face raised to provide sufficient strength at this point, this portion being formed into an angular lug 11. The sides of this face of plate 3 are also raised to form ribs 13, which may extend to the plane of the outer face of the plate 4, whereas the outer face of lug 11 will not.

Both plates 3 and 4 are provided with preferably integral perforated lugs or eyes 10 to receive a connecting device, the lug 10 of plate 3 being slightly longer than that of plate 4 to compensate for the additional thickness of the plate 4 beyond which it must extend.

The plate 4 is provided with a slot 7, as stated, extending from its lug 10 to the end of said plate, being of sufficient width to receive in succession the lug 11 and the perforated lug 10 of plate 3 and leaving on each side bifurcations 14 corresponding in width to the distance between the opposing faces of the lug 11 and the ribs 13, so that said faces will act both to guide and to brace said bifurcations.

In assembled relation the plates will be held in fixed relation to each other by nut 8 and bolt 5 operating through washer 12, the plates having first been applied to the felly C with the heads of their respective nails or studs 1 projecting through their slots 9 and the lips 2 of said heads overlying the adjacent portions of said plates 3 and 4. To adjust it is simply necessary to loosen the nut and move the plates lengthwise of each other. To apply and remove the devices it will be necessary, in each instance, to remove the nut 8 and separate the parts so long as nails or studs 1 having heads provided with lips 2 are employed.

In the modification shown in Fig. 4 the only change or modification from the preferred form found therein is the substitution on each plate 3 and 4 of a stud 15 having a cross-head or lateral arms or guard 16 adapted to receive the terminal links of the anti-skidding chain D without the interposition of connectors E.

Having thus described my invention, what I claim as new and desire to secure by Letters Patent is:

A wheel felly provided with permanent parts projecting from its lateral faces, in combination with an anti-skid element extending around the tire thereof, plates attached to the terminal portions of said element and having side portions provided with openings to receive said projections respectively and having portions formed at angles to their side portions and lying substantially parallel to the inner peripheral face of the adjacent portion of the felly and transversely of the same, one of said plates having a recessed face adapted to receive the other plate, and frictional means for clamping the two plates together in adjusted relation whereby the two plates may be quickly adjusted and locked together on the felly or separated and removed at will.

In testimony whereof, I have signed my name to this specification in the presence of two subscribing witnesses.

WILLIAM H. McLAUGHLIN.

Witnesses:
 WARREN D. CHASE,
 E. S. BERTON.